United States Patent [19]

Bergmann

[11] Patent Number: 4,653,535

[45] Date of Patent: Mar. 31, 1987

[54] SINGLE-LEVER SANITARY WATER VALVE

[75] Inventor: Konrad Bergmann, Wittlich, Fed. Rep. of Germany

[73] Assignee: American Standard Inc., New York, N.Y.

[21] Appl. No.: 904,797

[22] Filed: Sep. 5, 1986

Related U.S. Application Data

[63] Continuation of Ser. No. 635,382, Jul. 30, 1984, abandoned.

[30] Foreign Application Priority Data

Mar. 8, 1983 [DE] Fed. Rep. of Germany ....... 3327923

[51] Int. Cl.$^4$ .................. F16K 11/078; F16K 31/44
[52] U.S. Cl. .................. 137/625.17; 137/636.2; 251/232; 251/279
[58] Field of Search .......... 137/625.17, 625.4, 625.41, 137/636.2, 636.3, 636.4; 251/232, 279

[56] References Cited

U.S. PATENT DOCUMENTS

| | | | |
|---|---|---|---|
| 1,901,649 | 3/1933 | Huber | 251/279 |
| 2,456,078 | 12/1948 | Paille | 137/636.4 |
| 2,839,083 | 6/1958 | Moen | 137/636.2 |
| 2,870,790 | 1/1959 | Jordan | 251/279 |
| 4,050,475 | 9/1977 | Watts | 137/625.17 |
| 4,333,497 | 6/1982 | Busquets | 137/636.2 |
| 4,337,795 | 7/1982 | Argyris et al. | 137/625.17 |

FOREIGN PATENT DOCUMENTS

| | | | |
|---|---|---|---|
| 839299 | 5/1952 | Fed. Rep. of Germany | 251/232 |
| 3018180A1 | 11/1981 | Fed. Rep. of Germany | . |
| 2040021 | 8/1980 | United Kingdom | 137/636.2 |

*Primary Examiner*—Alan Cohan
*Assistant Examiner*—John A. Rivell
*Attorney, Agent, or Firm*—James J. Salerno, Jr.; Robert G. Crooks; John P. Sinnott

[57] ABSTRACT

A single-lever sanitary water valve is provided with a fixed cylinder which has at least one water inlet aperture and serves to receive a rotatable and/or slidable piston, by means of which the inlet aperture can be wholly or partly closed and can be linked to the outlet aperture, the slidable and/or rotatable piston being controlled by means of a lever assembly. The lever assembly includes a rotatable cap mounted on the valve body to which is coupled the piston and the adjusting lever via at least two linkage members so that first, second and third pivot bearings are formed at their respective points of connections whereby lateral forces acting on the piston are substantially eliminated when the adjusting lever is shifted between its raised and lowered positions.

9 Claims, 18 Drawing Figures

FIG. 2
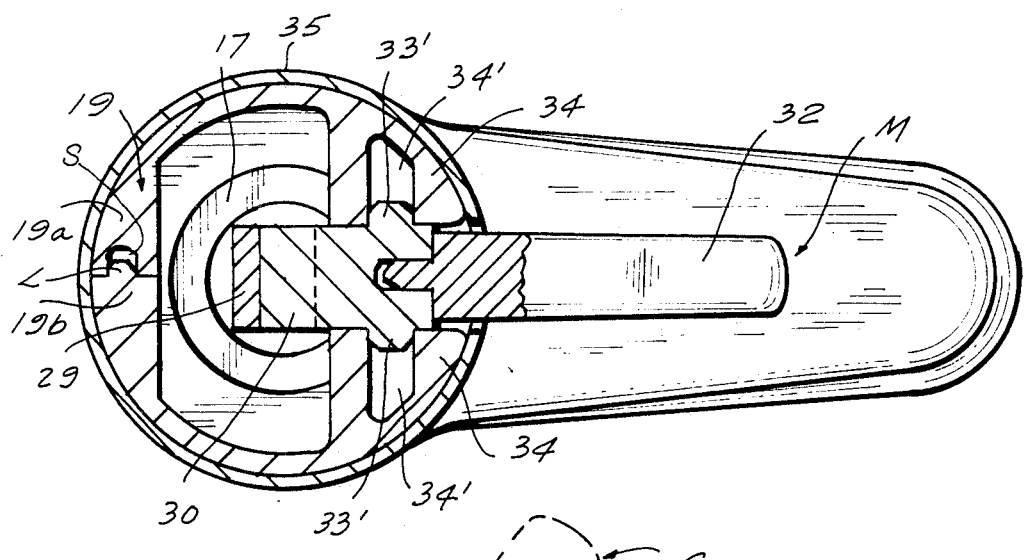
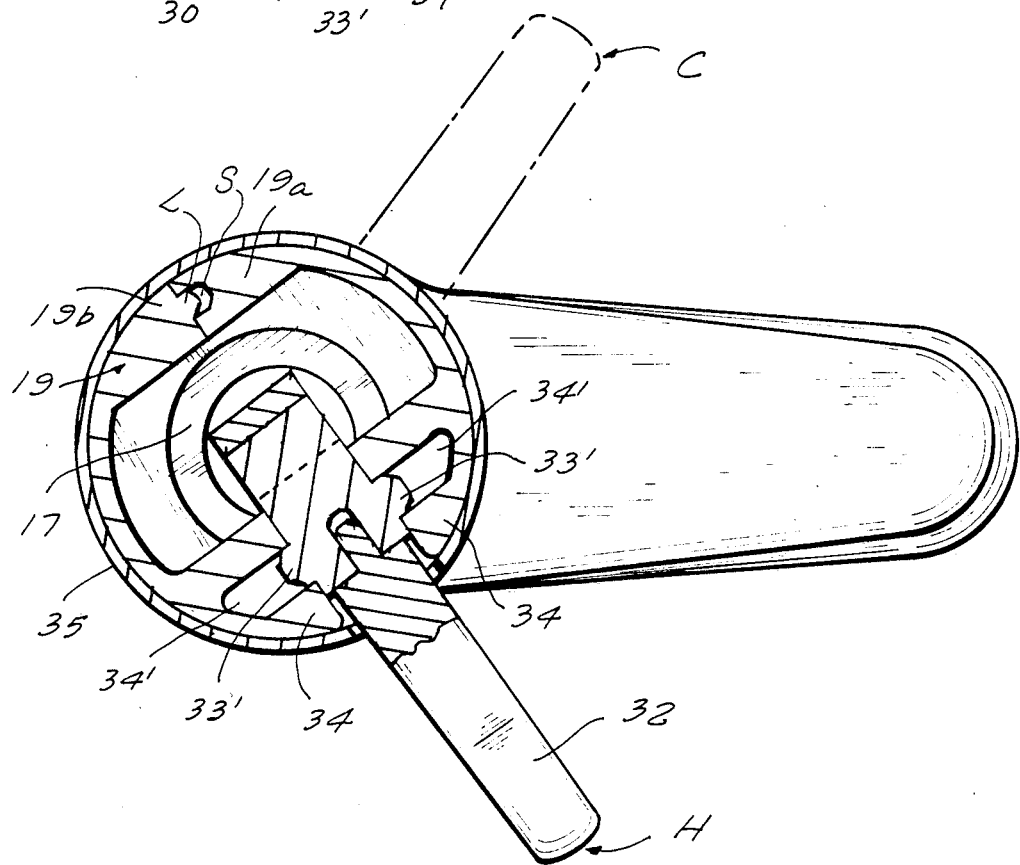
FIG. 3

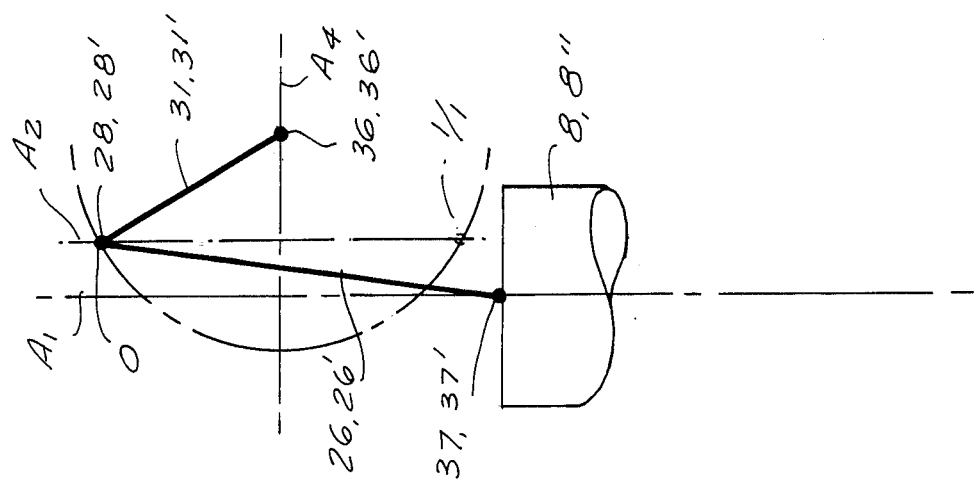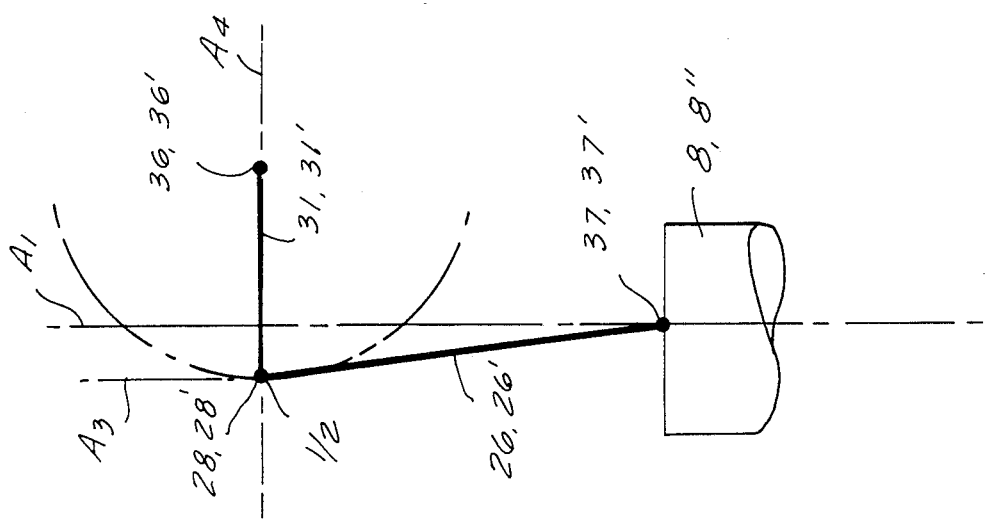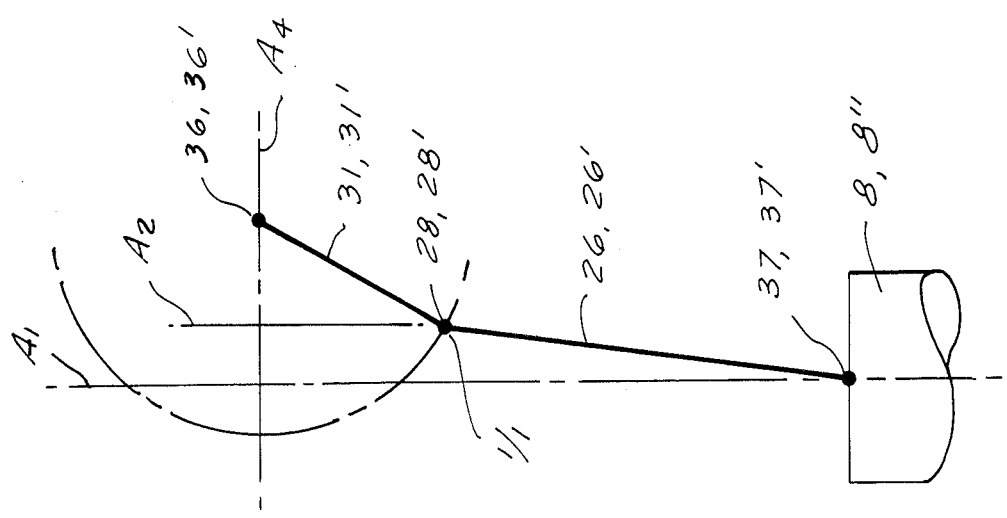

SINGLE-LEVER SANITARY WATER VALVE

This is a continuation of co-pending application Ser. No. 635,382 filed on July 30, 1984, now abandoned.

FIELD OF THE INVENTION

The invention relates to a single-lever sanitary water valve having a fixed cylinder, which has at least one inlet aperture and serves to receive a rotatable and/or slidable piston, by means of which the inlet aperture can be wholly or partly closed and linked with the outlet aperture, and the slidable and/or rotatable piston being controlled by means of an adjusting lever.

BRIEF DESCRIPTION OF THE PRIOR ART

Valves of this type have been known for a long time, particularly in the form of so-called single-lever or single-handle mixer valves. A hand lever with a lever pivot for a piston is also known from DE-OS 3018180; in this case, a pin engages into the control member to actuate the piston; the hand lever is pivotable by means of a cylinder body; the position of the fulcrum is displaceable, so that permanent lateral pressure is produced or lateral forces are applied by the paths of different lengths to be covered of the lever end, which forces have an unfavourable effect on the cylindrical body. These lateral forces acting on the head end of a cylinder can not be absorbed with a relatively short piston valve; the thus resulting lateral forces force the piston to make a tilting movement each time it moves, which is also transferred to the bearing; this has serious drawbacks regarding durability and ease of movement.

SUMMARY OF THE INVENTION

It is therefore an object of the invention to overcome the drawbacks in a drive for a piston of the above type, and to create a sanitary water valve which is simple in structure and reliable in operation.

This object is advantageously achieved by providing a connecting rod which is fitted at one or each end with one or two cylindrical pivot bearings, one pivot bearing being linked to the piston and the other pivot bearing to a lever part which is mounted in a pivot bearing located on the adjusting lever.

The advantages achieved with the invention are based in particular on the fact that wear due to friction is largely eliminated, jamming is avoided with the use of a relatively short piston and, moreover, the lateral forces also acting on the seals thereby virtually disappear completely.

It is provided according to further developments of the invention that the adjusting lever is mounted in a pivot bearing located on a cap and that this pivot bearing and the pivot bearing on the lever part lie roughly on a horizontal axis, A4 when the lever position is in the middle position of half flow.

As seen in FIGS. 16 A, B, and C, the vertical axis, A1 for the piston valve extends advantageously between axis, A2, on which the lever positions of its closed or 0 flow and full open or 1/1 are located, and the vertical axis, A3, on which the lever position, intermediate 1/2 is located, and, when the cylindrical pivot bearing located on the lever part is in the middle position, it is located on a horizontal axis, A4.

It can also be advantageous to provide the upper end of the connecting rod with a cylindrical bearing shell and/or cylindrical pins, and to provide the lower end with a cylindrical bearing shell or a cylindrical pin likewise.

The lever extension can also, according to individual requirements, be provided with a cylindrical pin or with a cylindrical bearing shell.

The provision is also advantageously made of fitting the piston valve with a bearing-shell-shaped recess or with a cylindrical pin; the provision is also made of securing a bearing shell or a cylindrical pin to the piston.

According to a further development feature of the single-lever sanitary water valve, a sleeve is arranged between the cylinder and the wall of the recess in the main body.

Another development according to the invention enables a guide body provided with a guide groove to be arranged on the cylinder and the seal, into which a cap with an annular lug pivotally engages the guide groove.

The provision is advantageously made for certain cases to arrange the pivot bearing on the rear of the cap.

BRIEF DESCRIPTION OF THE PREFERRED EMBODIMENTS

The invention will be described in greater detail below with the aid of embodiments and with reference to the attached drawings.

There are shown:

FIGS. 2 and 3 are plan views, partly in section, of the single-lever sanitary water valve taken through line 2—2 of FIG. 1;

FIGS. 16A, 16B and 16C are greatly exaggerated views which schematically illustrate the various positions of the lever and valve assmemblies of FIGS. 5–7 and 12–14 when the sanitary water valve of FIGS. 1 and 11 are in their operating modes of full open, half open and full closed respectively.

DETAILED DESCRIPTION OF THE PREFERRED EMBODIMENTS

Figure 1:
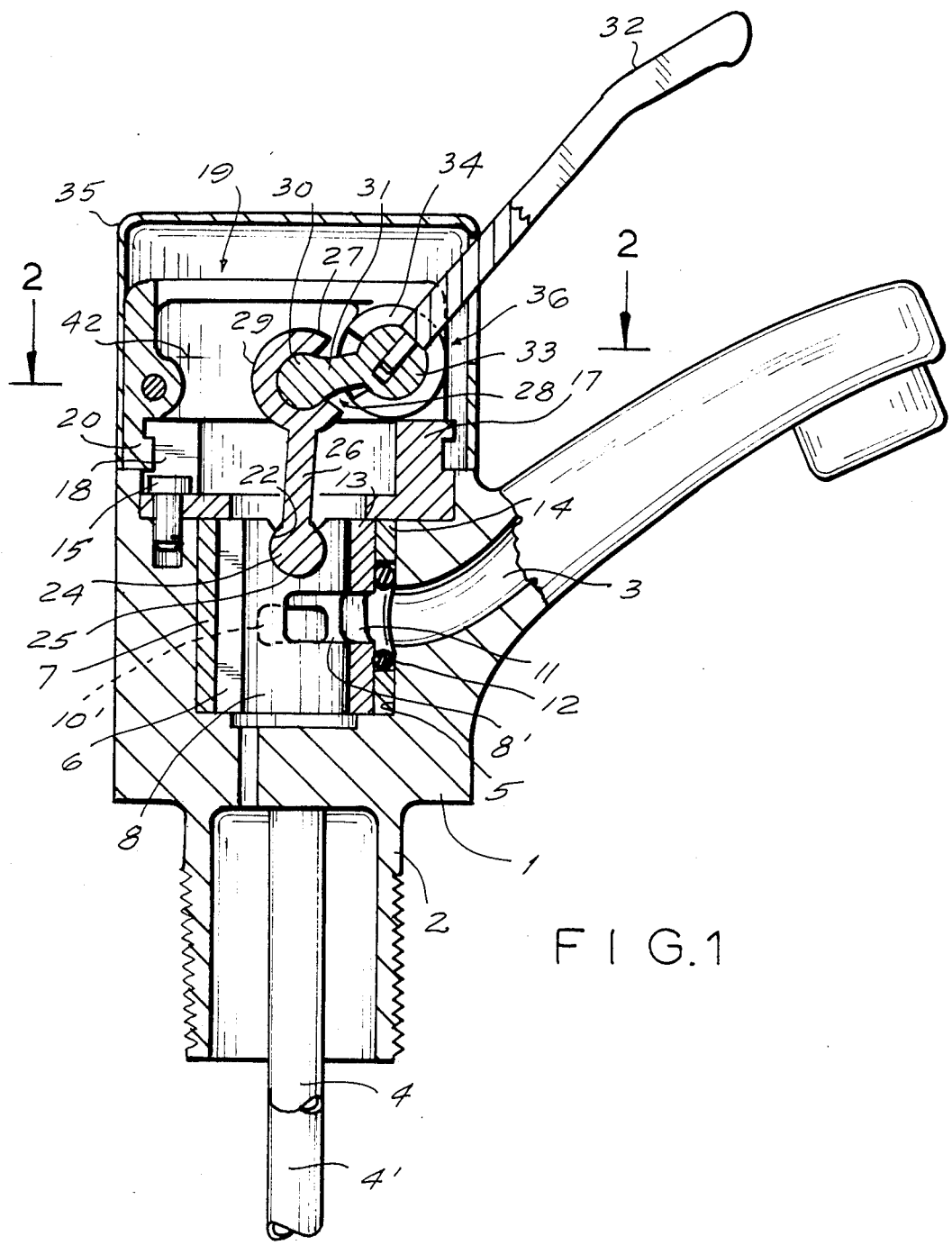
FIG. 1 is an elevational view, partly in section, of a single-lever sanitary water valve according to one form of the invention.
Figure 4:
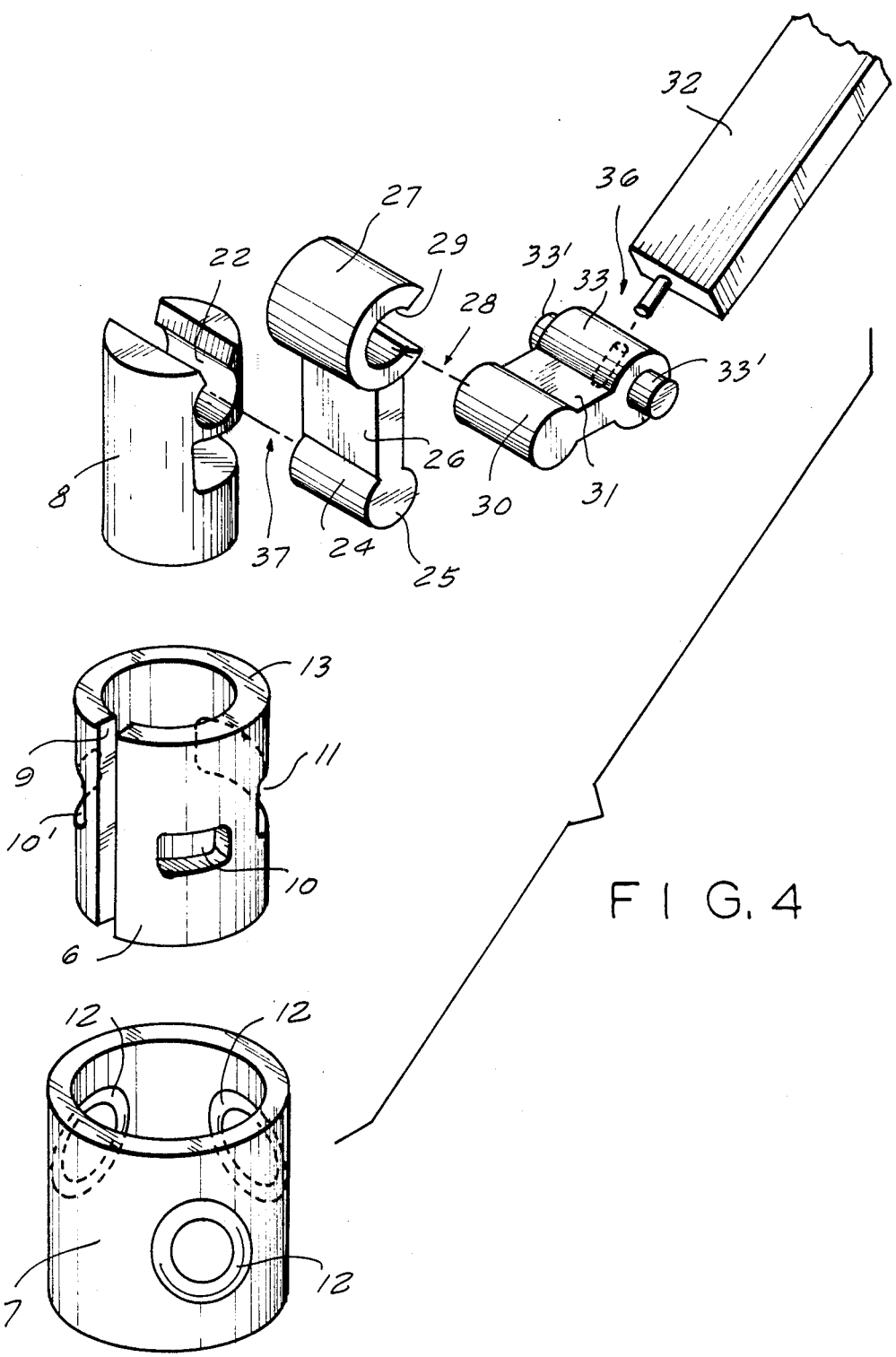
FIG. 4 is an exploded isometric view illustrating the various elements forming the valve and lever assemblies of the valve of FIG. 1.

The present invention is illustrated in the accompanying figures wherein similar parts are indicated by the same reference numeral throughout the several views and where modified parts are used, the modified parts are referenced by the prime of the referenced numeral.

FIGS. 1-4 show one form of a single-lever sanitary water valve consisting of a main body 1 having a securing and connecting piece 2 and a water outlet channel or passageway 3. Hot and cold water supply pipes 4, 4' are positioned throughout the connecting piece 2.

The main body 1 is also provided with a recess 5 into which a ceramic cylinder 6 enclosed by a sleeve 7 is positioned. A rotatable and/or slidable piston 8 having a mixing chamber or recess 8' is positioned in the ceramic cylinder 6.

Cylinder 6 is formed having a longitudinal through slot 9 and is provided with inlet apertures 10, 10' for hot and cold water, and an outlet aperture 11 for the mixed water. O-rings 12 positioned around the inlet and outlet apertures, provide water-tight seals between sleeve 6 and the wall of the recess 5. A guide body 17, is mounted on valve body 1 by screw 15, which acts on one face 13 of the cylinder 6 and on one face 14 of the sleeve 7 to hold each in place. The guide body 17 is fitted with an encircling guide groove 18, in which a cap 19 is rotatably mounted by means of a projecting annular lug 20.

The piston valve 8 is provided with a cylindrical bearing-shell-shaped recess 22. A cylindrical pin 24 engages into the cylindrical bearing-shell-shaped recess 22, together these form a pivot bearing 37. The cylindrical bearing pin 24 is arranged at the lower end 25 of a connecting rod 26.

There is provided at the upper end 27 of the connecting rod 26 a cylindrical bearing shell 29, which in turn encloses a cylindrical pin 30, which together form a pivot bearing 28. The cylindrical pin 30 forms the end of a lever part 31 of an adjusting lever 32. The adjusting lever 32 is pivotally mounted, by means of a cylindrical pin 33, in a cylindrical bearing shell 34 provided on the cap 19, and both together form a pivot bearing 36. A covering cap 35 is inserted over the whole cap 19. The pivot bearing 36 can also be arranged on the rear of the cap 19 at a point indicated by position 42.

Figure 5:
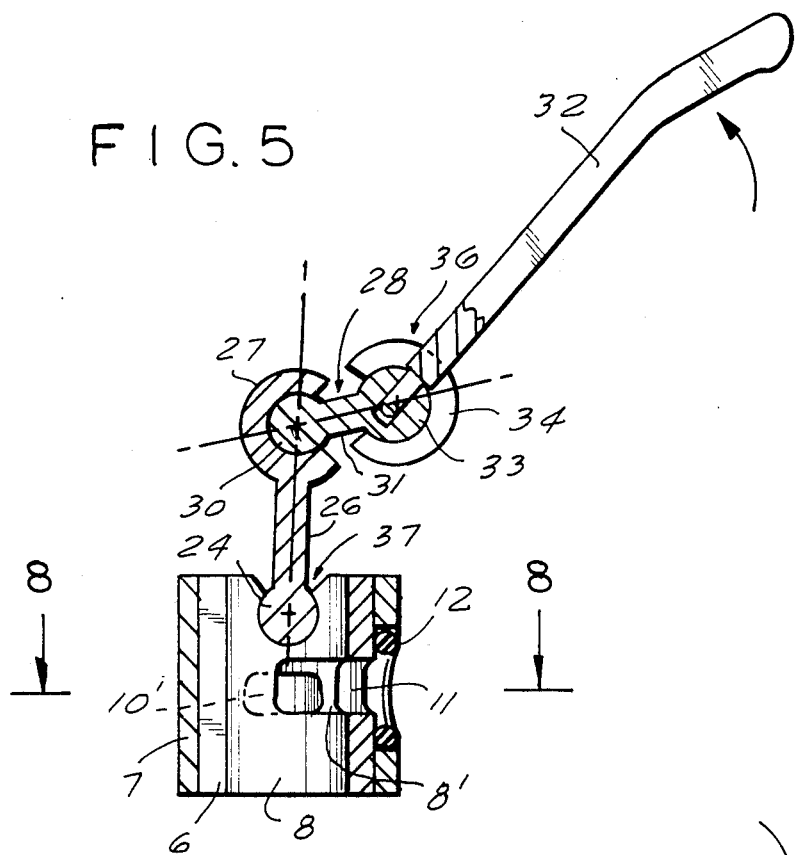
FIGS. 5–7 are sequential views of the valve and lever assemblies shown in FIG. 4 which illustrate the valving elements of FIG. 1 in its various modes of full open, half open and full closed positions respectively and which are illustrated schematically in FIGS. 16A, 16B, and 16C.
Figure 9:
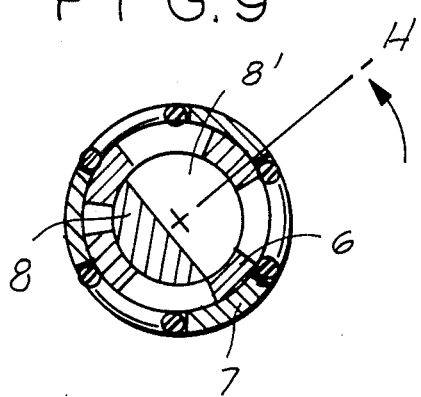
Figure 10:
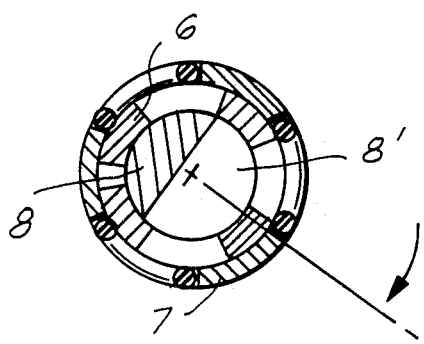

FIGS. 2 and 3 show the single-lever sanitary water valve in plan view, according to the section through 2—2 in FIG. 1. Here, the rotatable cap 19 consists of two half-shells 19a and 19b, are keyed together by lug L formed on half shell 19b and a complimentary recess S formed in half shell 19a as shown in FIGS. 2 and 3. The cylindrical bearing pins 33' are mounted in complimentary recesses 34' and in the cylindrical bearing shells 34 formed on rotatable cap 19. The adjusting lever 32 is rotatable along the shown path, FIGS. 8-10. In FIG. 8 the adjusting lever is in its intermediate position M to provide equal volume of hot and cold water. In FIG. 9 the adjusting lever is in its open position H for hot water flow and in FIG. 10 the adjusting lever is in its open position C for cold water flow. The adjusting lever is shiftable up and down as shown in FIGS. 5-7 for the desired amount of water volume as illustrated in FIG. 1.

Figure 11:
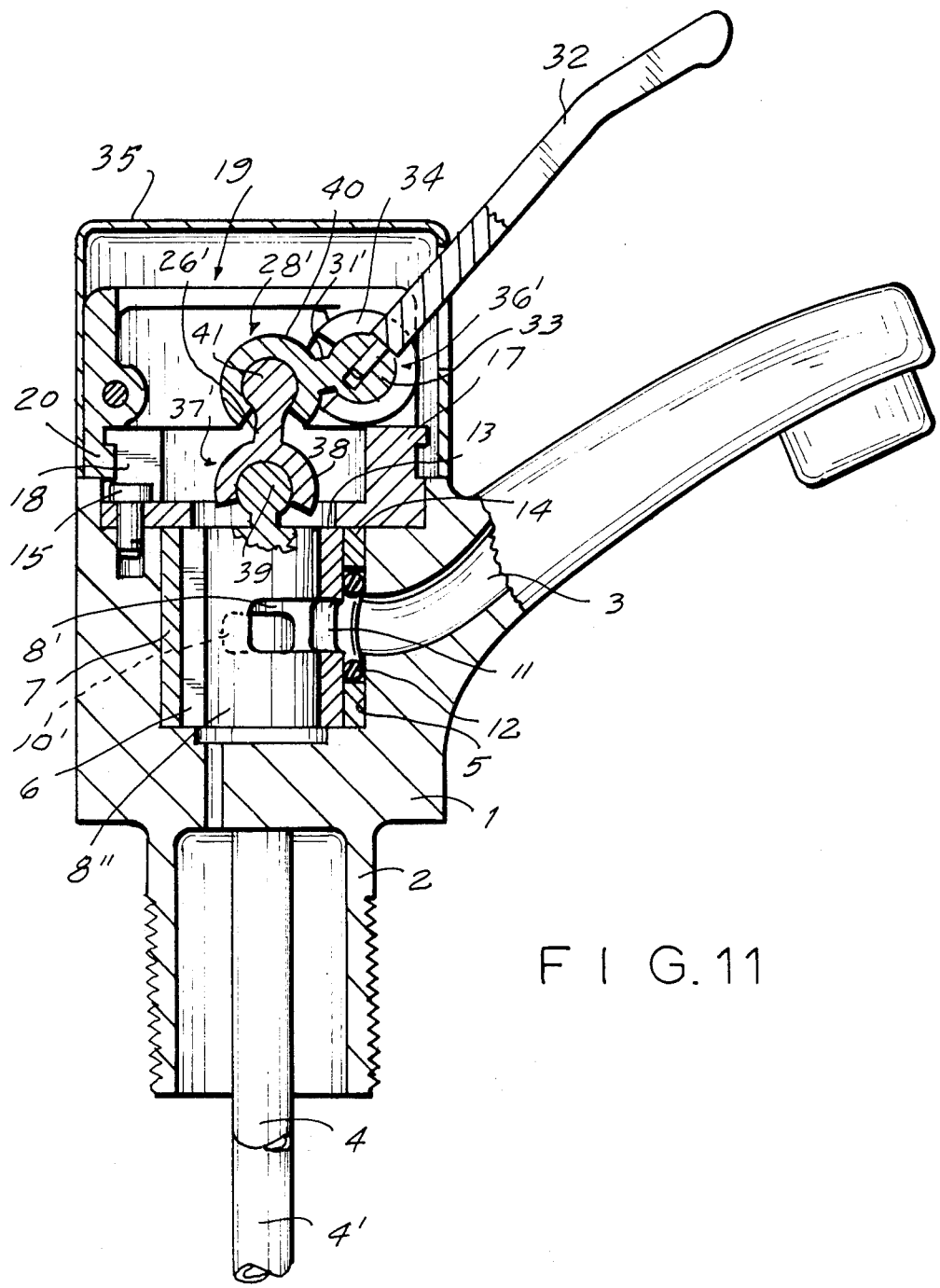
FIG. 11 is a view similar to FIG. 1 but which illustrates another form of the lever assembly.

FIG. 11 shows a further embodiment of the design of connecting rod 26'. There is provided connecting rod 26' which includes a cylindrical bearing shell 38 which is positioned at its lower end 25'. The piston 8" is provided with a cylindrical pin 39 which together form pivot bearing 37'. The lever part 31' is provided with a cylindrical bearing shell 40, into which a cylindrical pin 41 formed on the upper end of lever 36', which together form pivot bearing 28'.

Figure 6:
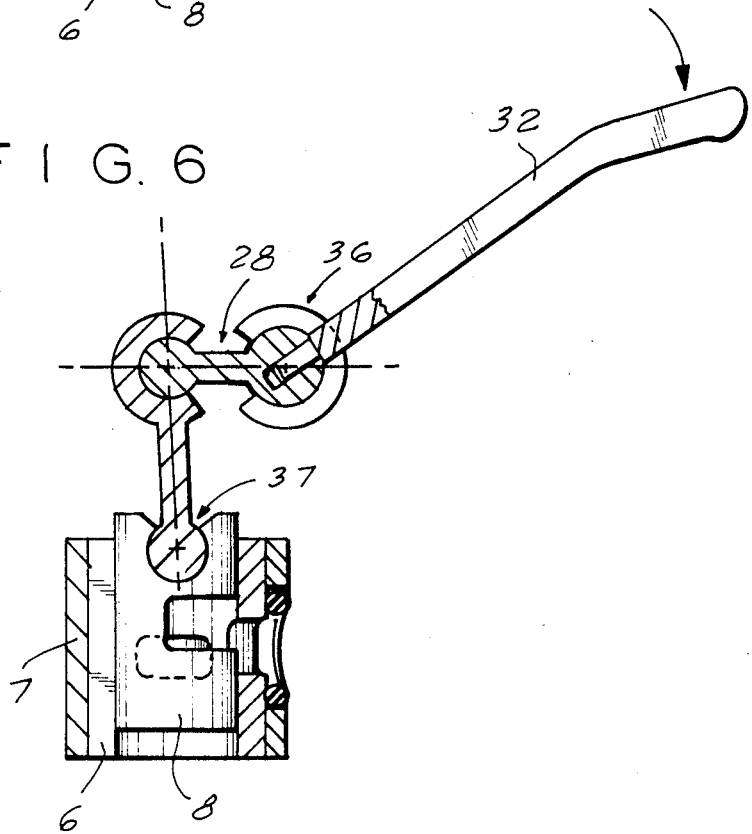
Figure 7:
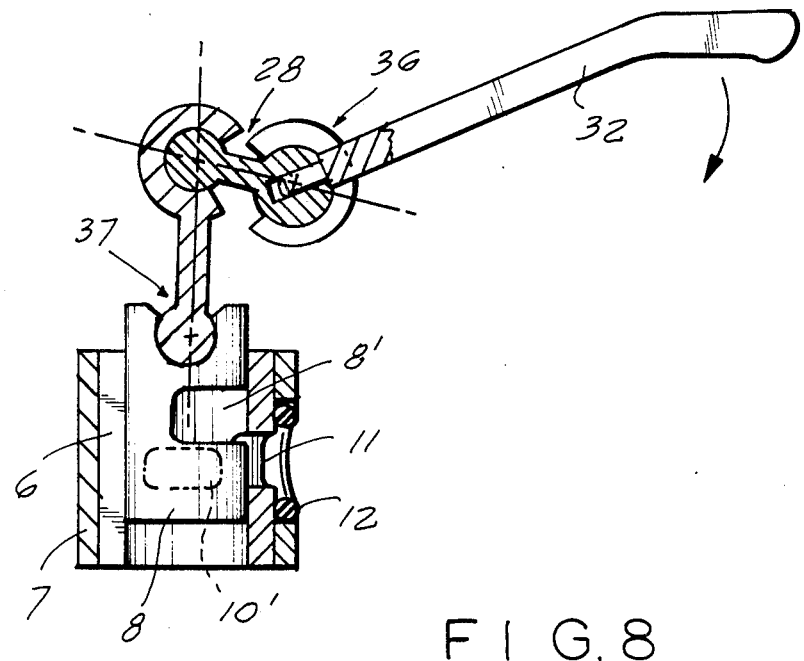
Figure 8:
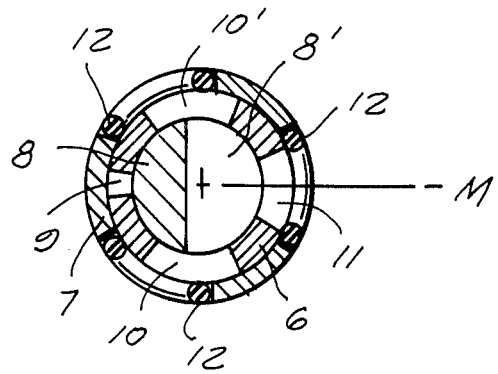
FIGS. 8–10 are sectional views taken along line 8—8 of FIG. 5 which illustrate the position of the valve elements in its various operating modes of equal mixing of cold and hot water, its full cold water flow and its full hot water flow respectively.
Figure 12:
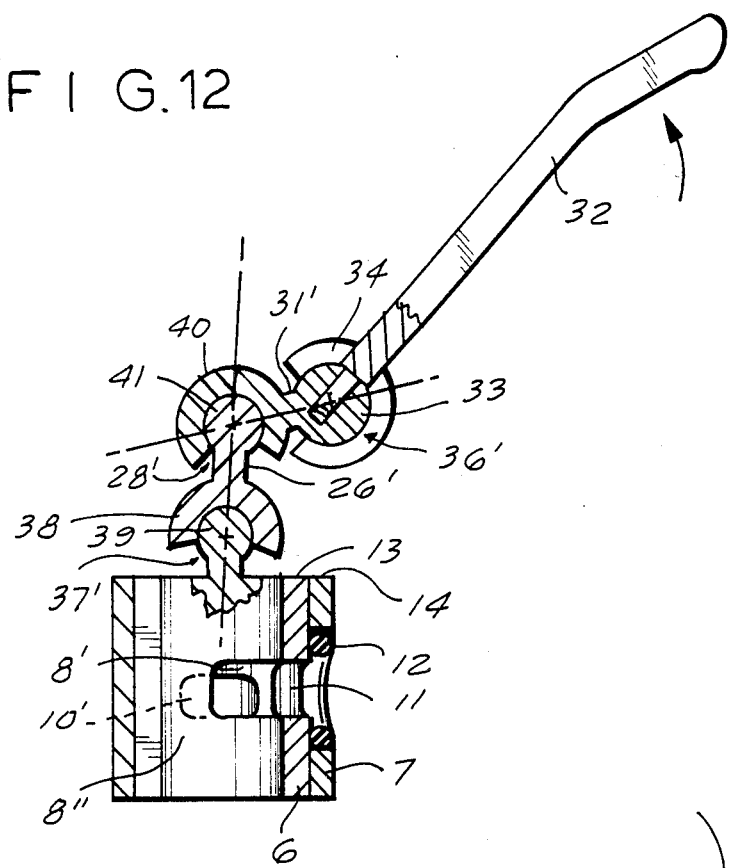
FIGS. 12–14 are views similar to FIGS. 5–7 which illustrate the various operating positions of the lever and valve assemblies of full open, half closed and full closed respectively and which are schematically illustrated in FIGS. 16A, 16B and 16C.
Figure 13:
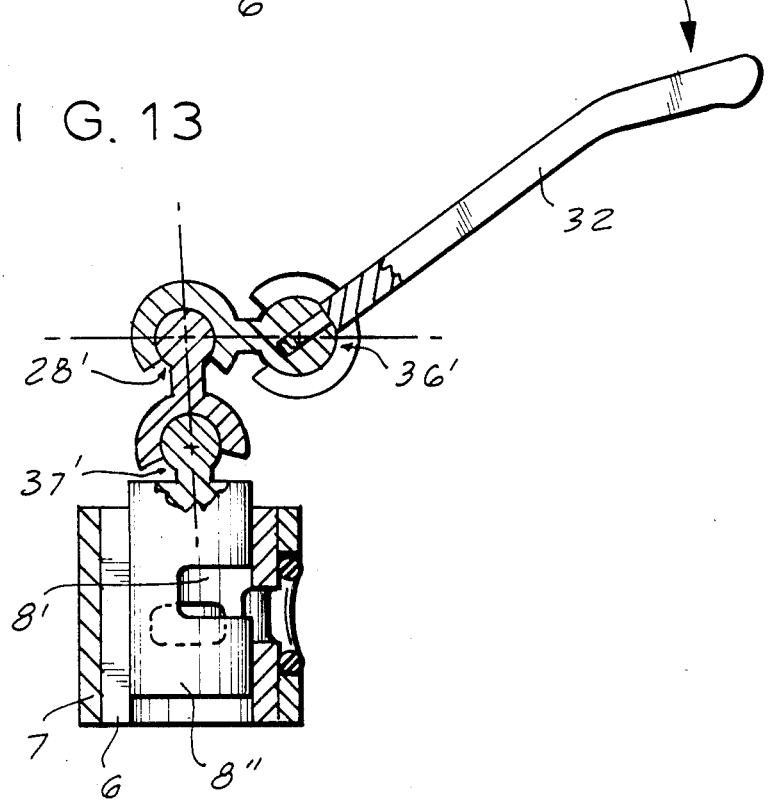
Figure 14:
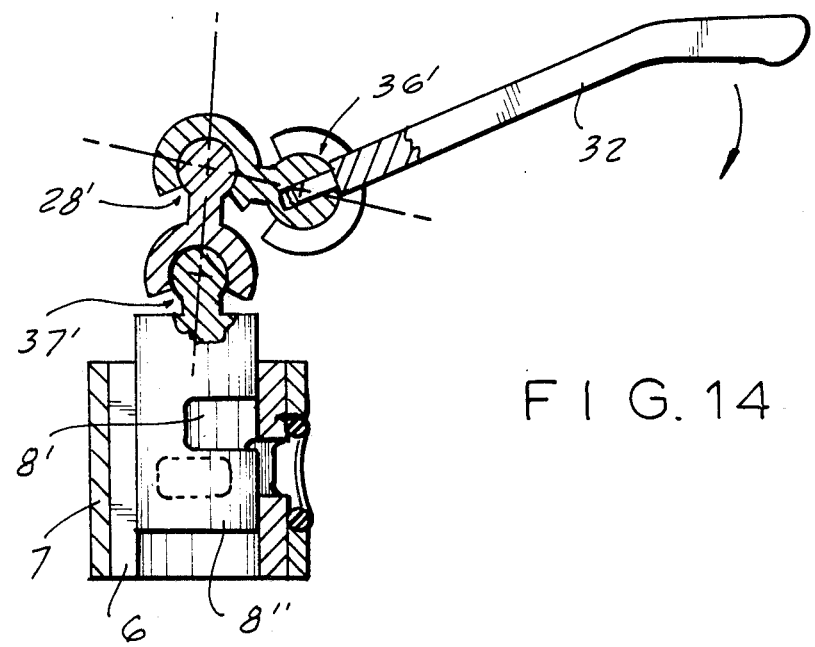
Figure 15:
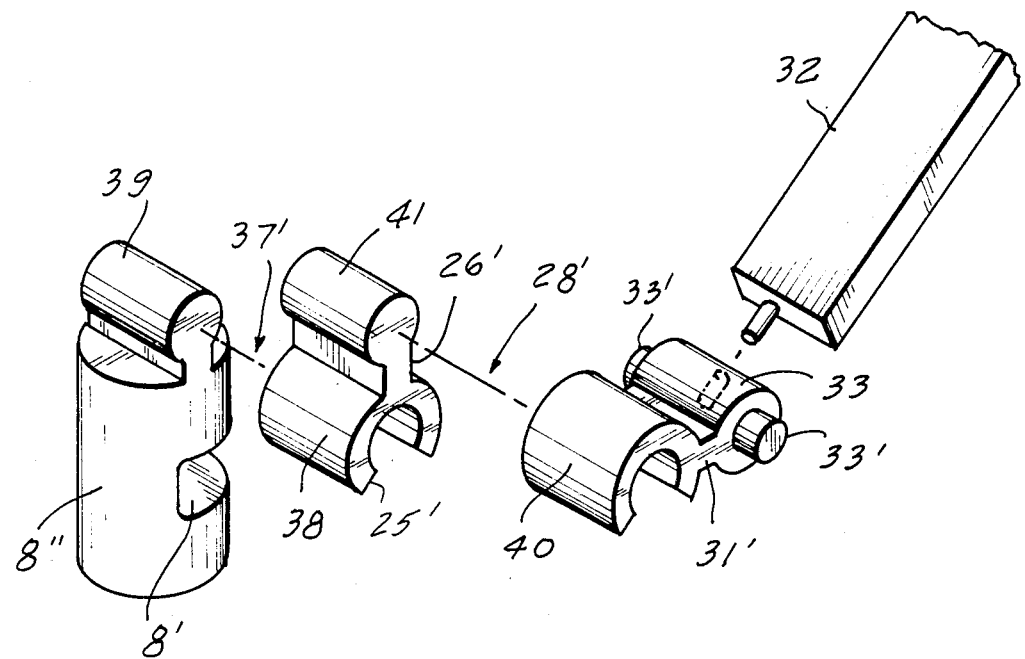
FIG. 15 is an exploded isometric view of the lever assembly of FIG. 11.

FIGS. 12, 13 and 14 are similar to FIGS. 6, 7 and 8 and depict the lever and valve assemblies of FIG. 11 in its full open, intermediate or half flow and closed positions respectively.

FIGS. 16A 16B and 16C are diagramatic views of the lever and piston assemblies of FIGS. 1 and 11 showing the operating paths of pivot bearings 28, 28', 36, 36', 37, 37'. The adjusting lever 32 is mounted in the pivot bearing 36, 36' and the lever part 31, 31' carries the pivot bearing 28, 28'. A1 denotes a vertical axis extending through the centre of the piston valve 8, 8".

When the single-lever sanitary water valve is closed, the bearing 28, 28' on the lever part 31, 31' is located in a position 0, which in turn lies on a vertical axis, A2.

As shown in FIG. 16B the pivot bearing 28, 28' on the lever part 31 is in position 1/2, FIGS. 6 and 13, it is at the same time positioned on the vertical axis, A3 and on the horizontal axis, A4 on which the pivot bearing 36, 36' is located. When the valve and lever assemblies are in position 1/1, FIGS. 5 and 12, the pivot bearing 28, 28' is located on the vertical axis, A2, shown in FIG. 16A. The connecting rod 26, 26' then rotates in the bearing 37, 37' and moves the piston valve 8, 8" up and down between its open and closed positions, FIGS. 7, 14 and shown diagramatically in FIGS. 16A and 16C respectively.

The method of operation of the single-lever sanitary water valve according to the invention therefore corresponds to that of known piston valves. Temperature control is effected by rotating the piston 8, 8". Piston 8, 8" and cylinder 6, 6' are preferably formed of aluminum oxide. The shifting of the adjusting lever from its down or closed position to its raised or up position permits the selection of volume of water flow from no flow to full flow, FIGS. 5-7 and by rotating the adjusting lever, the temperature of the flow of water is controlled from cold to hot, FIGS. 8-10.

CROSS REFERENCE TO RELATED APPLICATION

This patent application relates to my co-pending U.S. patent application Ser. No. 509,126 filed June 30, 1983, now abandoned entitled Sanitary Water Valve.

What is claimed:

1. A sanitary water valve comprising:

a valve body including a cylinder mounted therein;

said cylinder having at least one inlet aperture and an outlet aperture;

a piston having a piston axis existing in said cylinder and longitudinally shiftable along said piston axis and rotatable about said axis with respect to said cylinder;

a lever assembly coupled to said piston;

said lever assembly including an adjusting lever pivotally and rotatably mounted on said valve body and being shiftable about a first pivot bearing on a lever axis between open and closed positions to control the flow of water through said valve;

a linkage member pivotally coupled at one end to said piston so as to be rotatable about a second pivot bearing on the piston axis and pivotally coupled to the lever assembly so as to be rotatable about a third pivot bearing on a linkage axis; and the lever assembly, linkage member and piston being arranged so that, as the lever assembly is shifted between the open and closed positions, the third pivot bearing and the linkage axis will shift between opposing lateral sides of the second pivot bearing and the piston axis to thereby assist in balancing and minimizing lateral forces being applied to the piston.

2. The invention in accordance with claim 1 wherein, when the lever assembly is in the open and closed positions, the third pivot bearing and the first pivot bearing are located on one side of said second pivot bearing and, when the lever is located at a substantially intermediate position between the open and closed positions, the first pivot bearing and the third pivot bearings will be on opposite sides of the second pivot bearing and arranged along an axis substantially perpendicular to the piston axis and the third pivot bearing travels between opposing sides of the first pivot bearing as the lever is moved between the open and closed positions.

3. The invention in accordance with claim 1 wherein said lever assembly includes a rotatable cap mounted on said valve body, and said rotatable cap being coupled to said lever assembly to form said first pivot bearing.

4. The invention in accordance with claim 1 wherein a second linkage member connected between said first and third pivot bearings is positioned substantially perpendicular to the piston axis when said adjusting lever is shifted to its intermediate position.

5. The invention in accordance with claim 1 wherein the opposite ends of said linkage member are shaped in the form of a cylindrical pin and a cylindrical bearing shell, respectively.

6. The invention in accordance with claim 1 wherein the upper section of said piston is shaped in the form of a cylindrical pin.

7. The invention in accordance with claim 1 wherein the upper section of said piston is formed having a recess which is shaped in the form of a cylindrical bearing shell.

8. The invention in accordance with claim 1 wherein the valve body includes a guide body mounted thereon, and said guide body having an annular groove formed around its outer periphery to provide a race to rotatably mount said lever assembly therein.

9. The invention in accordance with claim 8 wherein said lever assembly includes a cap, and said cap having an annular lug which is received in said annular groove of said guide body so that said cap is rotatably mounted thereon.

* * * * *